May 17, 1960 J. A. A. RAPER ET AL 2,937,343
MODULATION SYSTEM
Filed Oct. 18, 1954

INVENTORS:
JOHN A. A. RAPER,
ARTHUR P. STERN,
BY George V. Eltgroth
THEIR ATTORNEY.

United States Patent Office 2,937,343

Patented May 17, 1960

2,937,343

MODULATION SYSTEM

John A. A. Raper and Arthur P. Stern, Syracuse, N.Y., assignors to General Electric Company, a corporation of New York Application October 18, 1954, Serial No. 464,008

2 Claims. (Cl. 332—31)

The present invention relates to modulation systems and has an an object thereof the production of a modulation system employing a single semiconductor device.

Modulation systems have been defined to include those systems in which a characteristic of a first wave is modified by a second wave, thereby producing a resultant wave which differs from the first wave in one or more of its parameters. In the present invention two modulation systems are disclosed. In one, two waves of comparable frequencies are combined to form a resultant wave in which the frequency is the parameter modified, and in the other two waves of dissimilar frequencies are combined to form resultant waves which are modified substantially both in amplitude and in frequency.

The present invention is related to the invention disclosed in application Serial No. 462,767, filed October 18, 1954 which issued as Patent No. 2,878,376 on March 17, 1959, in the name of A. P. Stern, and assigned to the assignee of the present invention. In that invention, a simplified modulation system of general application is disclosed in which a single semiconductor device performs a plurality of functions. In that application, a single three-electrode semiconductor device performs jointly the task of modulating one wave by another wave which is locally generated, and the task of generating this local wave. In order to establish oscillations within the frequency converter there disclosed, a transistor having an alpha greater than unity is employed, connected so as to utilize the negative impedance characteristic which such transistors exhibit. In the present application, however, a frequency converter is disclosed in which a single transistor performs all of said functions, and in which the transistor may have an alpha either larger than or smaller than unity.

Accordingly, it is an object of the present invention to provide an improved modulation system.

It is another object of the invention to provide an improved frequency converter.

It is a further object of the invention to provide an improved amplitude modulator.

It is a further object of the present invention to provide a modulation system employing a single transistor which performs jointly the functions of modulating a first wave with a second wave, and generating one of said waves.

It is still another object of the present invention to provide a modulation system employing a single three electrode transistor, which may have an alpha less than or greater than unity in performance of the functions of modulating a first wave with a second wave and generating one of said waves.

These and other objects are achieved in a novel modulation system wherein electric wave energy of a first frequency is applied to one input electrode of a transistor and locally derived electric wave energy of a second frequency is applied to the other input electrode, said locally derived electric wave energy being derived by means of an oscillation circuit having at least three regions of connection coupled to said transistor so as to excite oscillations within it. Modulation components arise in the transistor by virtue of operation of the transistor over a non-linear region of its characteristic usually arising under the influence of the locally derived oscillations. A frequency selective filter is provided connected to the output circuit of the transistor and tuned to reject undesired waves and to select desired modulated waves.

An advantageous arrangement is shown in which an oscillatory circuit is employed which exhibits an impedance maximum between the input electrodes at the frequency of the locally generated oscillations and a relatively low impedance at the frequency of the applied electric waves. In addition, the input circuit for the applied waves is of the type which provides an impedance maximum at the frequencies of the externally applied waves and a relatively low impedance to the locally generated waves. These two features make for efficient operation of the transistor modulation system.

The features of the invention which are believed to be novel are set forth with particularity in the appended claims. The invention, itself, however, both as to its organization and method of operation, together with further objects and advantages thereof may best be understood by reference to the following description when taken in connection with the attached drawings, wherein:

Figure 1:
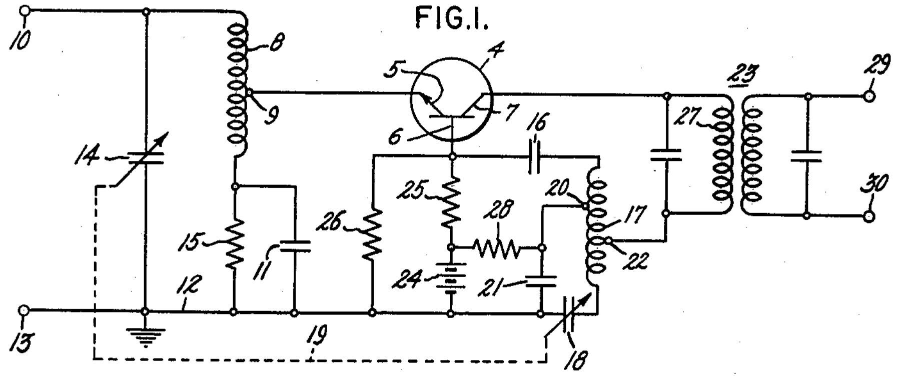
Fig. 1 is a frequency converter of a type suited for use as a first detector in a super-heterodyne receiver.

Fig. 1 illustrates a frequency converter embodying the invention and employing a single transistor in a circuit adapted for use in a super-heterodyne receiver. At 4 is shown an NPN junction type transistor having an emitter electrode 5, a base electrode 6, and a collector electrode 7.

The signal input circuit is associated with the emitter electrode 5. The emitter electrode 5 is connected to inductance 8 at a tap 9. One end terminal of inductance 8 is connected to the converter input terminal 10 and the other end terminal of inductance 8 is connected through a capacitance 11 to a ground bus 12. The capacitance 11 has a low impedance at the frequencies of the applied signals. The other converter input terminal 13 is connected to ground bus 12. A variable tuning capacitance 14 has one terminal connected to input terminal 10 and the other connected to ground bus 12 so as to form a parallel resonant circuit in cooperation with inductance 8. Resistance 15 shunts capacitance 11 and provides a direct current return path to the emitter 5.

The oscillation generation circuit is associated with the base electrode 6 and includes a feedback connection from the collector electrode 7. The base electrode 6 is connected through a coupling capacitance 16 to one end terminal of an inductance 17 which may be formed of a continuous winding having two taps 20 and 22 between its end terminals. The other end terminal of inductance 17 is connected to one terminal of a variable tuning capacitance 18. For convenience in tuning the frequency converter over a range of input signal frequencies, while still producing a fixed output frequency, the variable capacitance 18 may be ganged with the variable capacitance 14 as shown symbolically by the dashed line 19. The other terminal of capacitance 18 is connected to the ground bus 12. The tap 20 on inductance 17, which tap is in closer proximity to the terminal of inductance 17 coupled to the base electrode connected capacitance 16, is coupled through a capacitance 21 to the ground bus 12. The capacitance 21 has a low impedance at the frequencies appearing in the transistor circuit, and serves to complete a parallel resonant circuit including tuning capacitance 18 and that portion of inductance 17 bounded by the connection to capacitance 18 and the tap 20. The tap 22, placed in closer proximity to the end terminal of inductance 17 which is connected to the capacitance 18, is linked with one input terminal of a tuned output transformer 23. Bias for the base electrode 6 is provided from a source 24 of direct potentials having its negative terminal connected to the ground bus 12. The positive terminal of source 24 is connected to a voltage divider comprising a resistance 25 connected in series with a resistance 26, one terminal of resistance 26 being connected to ground bus 12. The base electrode 6 is connected to the junction between the terminals of resistances 25 and 26.

The converter output connections are made to the collector electrode 7. Collector 7 is connected to the other input terminal of tuned output transformer 23. Energization for collector electrode 7 is provided by a series circuit including the primary winding 27 of output transformer 23, the portion of inductance 17 included between taps 22 and 20, and a resistance 28, connected between tap 20 and the positive terminal of source 24. The output terminals of tuned output transformer 23 are coupled to the output terminals 29 and 30 of the frequency converter.

The embodiment shown in Fig. 1 employs a single transistor in effecting frequency conversion of a signal of higher frequency, to a relatively low intermediate frequency. Signals lying over a band of frequencies are applied at the input terminals 10 and 13. The desired signal is selected from this band of frequencies by the parallel resonant tuned circuit comprising inductance 8 and tuning capacitance 14 and is applied at the proper impedance level from the tap 9 on the inductance 8 to the emitter electrode 5. The tap 9 on inductance 8 is adjusted to minimize the loading effect of the emitter electrode 5 on the tuned input circuit while providing adequate power transfer. The selected signal voltage thus appears between the emitter electrode 5 and the ground bus 12. Assuming a low impedance path at the signal frequency between the base electrode 6 and ground, the voltage is established primarily between base and emitter electrodes to produce changes in the emitter current.

Oscillations are developed in the transistor 4 in cooperation with a three terminal oscillation circuit connected with it. The base electrode 6 is inductively coupled with the section of the oscillation circuit which establishes the oscillation frequency of the locally generated oscillations. The portion of the inductance 17 coupled between tap 20 and capacitance 16 provides inductive coupling between the base electrode 6 and the parallel resonant tuned circuit in which oscillations are developed. The other point to which the induced oscillation voltages are coupled is to the ground bus 12 through the capacitance 21. The tuned circuit coupled to the emitter electrode 5, having a resonant frequency different from the resonant frequency of the locally generated oscillations presents a relatively low impedance to these oscillations. For this reason relatively little of the locally generated oscillations appear between the emitter electrode and ground. Instead these oscillations are developed almost entirely across the base-emitter junction.

The oscillation circuit referred to is a three terminal network which comprises the variable capacitance 18 and tapped inductance 17. The parallel resonant circuit is completed between the tap 20 and the ground bus connected terminal of capacitance 18, by the capacitance 21 which provides a low impedance path to the incident waves. The resonant frequency of the oscillation tuned circuit is determined essentially by the values of capacitance 18 and inductance 17. Feedback is provided by virtue of the connection of the collector electrode 4 through a path including the primary of output transformer 23 and a portion of the inductance 17 between tap 22 and 20. Since the primary of transformer 23 is tuned to a frequency differing from that of the oscillator, it presents a small impedance to the locally generated oscillations.

The oscillation circuit coupled to the base electrode 6 provides relatively little voltage drop to signal voltages applied between the input electrodes. Since the resonant frequency of the oscillation circuit is removed from the frequency of the applied signals the impedance presented to external signals is essentially that of one of the reactive components, and may be chosen quite small.

Conversion action occurs by virtue of the simultaneous presence of a signal voltage applied between the emitter electrode 5 and ground, and a locally generated oscillation applied between the base electrode 6 and ground. The presence of the two voltages provides a net base-electrode emitter voltage which varies throughout a sufficiently large portion of the transistor characteristic to experience substantial non-linearity. By virtue of the non-linearity in operation of the transistor, the resultant current flow between the base and emitter is a non-linear function of the sum of the two applied voltages, this current containing the mixing or heterodyne current components. Accompanying the current flow between the base and emitter electrode, an amplified current appears in the collector 7 which contains the heterodyne or beat frequency components. The desired heterodyne component, usually that equal to the oscillation frequency less the applied frequency is selected at the terminals 29 and 30 by the tuned output transformer 23.

By way of illustration only, the following circuit values have been found to operate suitably in the environment illustrated in Fig. 1:

| | | |
|---|---|---|
| Capacitance **11** | microfarads | .01 |
| Resistance **15** | ohms | 2,000 |
| Resistance **25** | do | 100,000 |
| Resistance **26** | do | 2,200 |
| Capacitance **16** | microfarads | .05 |
| Capacitance **21** | do | .02 |
| Resistance **28** | ohms | 10,000 |
| Source **24** | volts | 6 |

These circuit elements established an emitter current in the transistor of slightly over 100 micro-amperes and a conversion gain of greater than 15 decibels.

Figure 2:
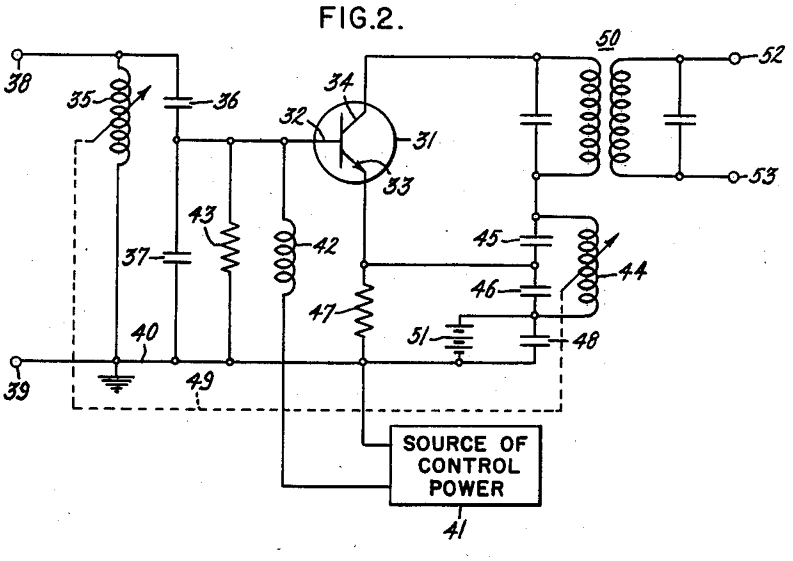
Fig. 2 is a frequency converter of a type suitable for use as a first detector of a super-heterodyne receiver, having a modified mode of tuning, and means for external gain control.

A second embodiment of the invention is shown in Fig. 2. In Fig. 2 the external radio frequency voltage is applied to the base electrode while the locally generated oscillator voltage is applied to the emitter electrode. As in the embodiment shown in Fig. 1, the beat frequency output of the converter is obtained at the collector electrode. An NPN junction type transistor is shown at 31 having a base electrode 32, an emitter electrode 33, and a collector electrode 34.

The signal input circuit is connected with base electrode 32. The signal selecting portion of the input circuit comprises a parallel resonant circuit which includes a variable inductance 35 and two capacitances 36 and 37. The variable inductance 35 has a movable core member for adjustment of the magnitude of the inductance indicated symbolically by the arrow intersecting the inductance. The two fixed capacitances 36 and 37 are serially connected in shunt with the inductance 35. The converter input terminals 38 and 39 are connected to the terminals of the inductance 35, the input terminal 39 being connected to the ground bus 40, to which one terminal of capacitance 37 is also connected. The base electrode 32 is connected to the joined terminal of capacitances 36 and 37 so as to obtain a desired fraction of the voltages established in the parallel resonant circuit established by the relative magnitudes of capacitances 36 and 37. A source of control power is shown at 41 having one terminal connected to ground bus 40, and the other through an inductance 42 to the base electrode 32. A resistance 43 is coupled between the base electrode 32 and the ground bus 40.

The oscillation generation circuit is connected with emitter electrode 33 and includes a feedback connection with the collector electrode 34. The frequency determining circuit for the oscillator comprises a variable inductance 44 and a pair of fixed capacitances 45 and 46 which are serially connected between the end terminals of the inductance 44. The emitter electrode 33 is connected to the joined terminals of capacitances 45 and 46, and through a resistance 47 to ground bus 40. The capacitance 46 has its terminal which is connected to an end terminal of inductance 44 connected through another capacitance 48 to ground. The adjustable inductance 44 may be ganged with adjustable inductance 35 for simultaneous adjustment therewith as shown symbolically by the dashed line 49.

Beat frequency components which are formed in the converter appear at the collector electrode 34. The output circuit to the collector 34 includes a double tuned output transformer 50. One input terminal of the transformer is connected to the collector electrode 34 and the other input terminal is connected to the end terminal of inductance 44 which is connected to capacitance 45. Energization of the collector 34 is provided by a source 51 of direct potentials having its negative terminal grounded and its positive terminal connected through a path including the primary winding of transformer 50 and the inductance 44. The output terminals of transformer 50 are connected to converter output terminals 52 and 53 respectively.

In operation the embodiment illustrated in Fig. 2 performs the same functions performed by the embodiment shown in Fig. 1. As previously noted, however, the signal and oscillator circuits are applied to different electrodes. Externally generated signals are applied to the input terminals 38 and 39 and where they establish signal potentials between the base electrode 32 and the ground bus 40. Simultaneously, oscillations are established in the emitter circuit at a frequency dependent on the resonant frequency of the tank circuit comprising inductance 44 and capacitances 45 and 46. These oscillations are excited by the collector feedback connection made through the primary of output transformer 50 to the oscillator tank circuit. They establish a voltage between the emitter 33 and ground.

Mixing action occurs on the simultaneous occurrence of the applied signal and the locally generated oscillation in the input circuit of the transistor at sufficient amplitude to cause non-linearity in the transistor characteristic.

The gain of the frequency converter illustrated in Fig. 2, may be readily controlled over a wide range. A source of control power is shown at 41 coupled through an inductance 42 to the base electrode 32. The source 41 is preferably of a minimum capacitance reactance, and is capable of supplying currents on the order of 200 micro-amperes without substantial regulation. The inductance 42 may be of such a value as to prevent the dissipation of externally applied or oscillator voltages in the control voltage circuit. It has been found that an increase in the emitter bias from an optimum bias to a value providing more linear operation of the transistor causes a larger oscillator voltage, but the increase in linearity reduces the magnitude of the heterodyne components produced. Similarly, operation at a decreased emitter current from the optimum bias to a region of less linear operation, reduces the oscillator voltage to a point where a reduction is caused in the magnitude of the heterodyne components produced.

The conversion circuit consequently is of considerable flexibility since either an increase or a decrease in the bias can be used to reduce the gain of the converter. It is usually desirable to adjust the converter bias by circuit components external to the source 41 to the optimum point, usually approximately 100 micro-amperes in common junction type transistors. When this adjustment is made, the source may be either one by which a reduction in emitter bias is occasioned or one by which an increase in emitter bias is occasioned. A change of 1 volt may affect the gain by as much as 20 decibels.

Figure 3:
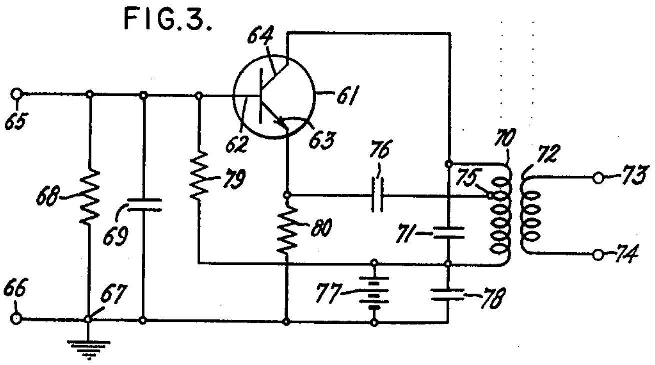
Fig. 3 is an amplitude modulator which is suited for use in producing an amplitude modulated radio frequency wave.

The invention is also applicable to devices in which it is desired to produce amplitude modulations of a carrier wave. Fig. 3 illustrates a system in which a radio frequency wave is modulated in amplitude by audio frequency voltages such as may be derived from a phonograph pickup.

The amplitude modulation device in this embodiment employs a single NPN transistor 61 having a base electrode 62, an emitter electrode 63 and a collector electrode 64. Input terminals of the amplitude modulation devices are shown at 65 and 66, and are connected respectively to the base electrode 62 and to a grounded bus 67. A resistance 68 and a capacitance 69, are connected between the base electrode 62 and the ground bus 67. The emitter electrode 63 is connected to the oscillation circuit, as is the collector electrode 64. The oscillation circuit comprises a primary inductance 70 and a capacitance 71 connected in shunt with it. A secondary inductance 72 is provided connected to the output terminals 73 and 74 of the amplitude modulator. The inductance 70 has an intermediately placed tap 75 which is coupled through a capacitance 76 to the emitter electrode 63. One end terminal of inductance 70 is connected to the collector electrode 64 while the other end terminal is connected to the positive terminal of source 77. The negative terminal of source 77 is connected to the ground bus 67. A capacitance 78 which provides a low impedance path to modulating frequencies as well as to the carrier frequency, shunts the source 77.

Energizing potentials for the transistor are provided by the source 77. A resistance 79 coupled between the positive terminal of source 77 and the base electrode 62 cooperates with a resistance 68 to form a voltage divider for adjustment of the base potential. Emitter bias is controlled by means of a resistance 80 coupled between the emitter 63 and the grounded bus 67. The collector 64 receives its energization through a conductive path which includes the primary inductance 70 of the oscillation circuit.

The arrangement shown in Fig. 3 receives audio frequency waves at its input terminals and delivers to the output terminals a radio frequency wave which is modulated in amplitude in accordance with the input audio frequency waves. Audio frequency voltages are applied at the terminals 65 and 66 where they are established principally between the base and emitter electrodes. The resistance 68 is of a value not substantially less than the internal impedance of the source of input signals. The capacitance 69 is of a relatively high impedance to all modulating signal voltage components. The capacitances 78 and 76 provide a low impedance path to modulation frequency voltage between the emitter 63 and the ground bus 67.

The oscillations locally generated are sustained and controlled in frequency by the oscillation circuit network. The collector output is connected to a tuned circuit comprising inductance 70 and capacitance 71. These last named circuit components determine the frequency at which oscillations will occur. The positive feedback path is provided by connection of the collector electrodes 64 to the inductance 70.

The production of modulation components arises when transistor 61 is oscillating and an audio modulation voltage is supplied to the input terminals of the modulator. Swinging the transistor operating point on its characteristic through the application of modulating potentials to the base 62 develops a modulated signal by varying the amplitude of the self-generated oscillations appearing across the resonant circuit 70, 71 and output winding 72 coupled thereto. The modulating voltage should preferably be relatively small compared to the voltages developed in the input circuit of the transistor 61 under the influence of oscillatory currents. The secondary inductance 72, which is inductively coupled to inductance 70 is arranged to eliminate audio frequency components which might otherwise occur and passes to the output terminals 73 and 74 essentially pure modulation components.

The previous embodiments have been illustrated employing NPN type transistors. The invention is equally applicable to transistors of the PNP type.

It should further be noted that in each of the specific arrangements illustrated, a three terminal type oscillator network is employed. It should be understood that the invention is equally applicable to oscillation circuits in which distributed rather than lumped impedances are employed, and in which connection is made at three regions of the distributed constant oscillation circuit. It is intended that the term "region" should include not only the end or tap terminals of lumped impedances but also those points at which connections are made in distributed constant type oscillation circuits.

While specific embodiments have been shown and described, it will be obvious to those skilled in the art that various changes and modifications may be made without departing from the invention in its broader aspects, and it is, therefore, intended in the appended claims to cover all such changes and modifications as fall within the true spirit and scope of the invention.

What we claim as new and desire to secure by Letters Patent of the United States is:

1. In a modulation system, the combination comprising a transistor having base, emitter, and collector electrodes, a tuned oscillation circuit connected with said emitter and collector electrodes in self-exciting oscillatory relationship whereby electric waves of a first frequency are produced, said oscillation circuit comprising an inductance and serially connected first and second capacitors connected in parallel with said inductance, said emitter electrode being connected to the junction of said first and second capacitors, means for coupling electric wave energy of a second frequency to said base electrode, a frequency selective transformer including a primary winding for selecting the desired modulated wave energy, a source of direct current, a direct current coupled series circuit connected between said emitter and collector electrodes and comprising in the order recited said source of direct current, said inductance and said primary winding.

2. The modulation system of claim 1 including means far varying the amplitude of said selected modulated wave energy comprising a source of control power and means for connecting said source to said base and said emitter electrodes whereby emitter current may be varied from an optimum bias point so as to produce a decrease in said amplitude.

References Cited in the file of this patent

UNITED STATES PATENTS

| | | |
|---|---|---|
| 2,050,807 | Roberts | Aug. 11, 1936 |
| 2,077,269 | Schlesinger | Apr. 13, 1937 |
| 2,582,683 | Dammers | Jan. 15, 1952 |
| 2,751,446 | Bopp | June 19, 1956 |
| 2,757,287 | Stanley | July 31, 1956 |
| 2,816,220 | Goodrich | Dec. 10, 1957 |

FOREIGN PATENTS

| | | |
|---|---|---|
| 506,781 | Belgium | Nov. 14, 1951 |